US005659006A

United States Patent [19]
White

[11] Patent Number: 5,659,006
[45] Date of Patent: Aug. 19, 1997

[54] METHOD FOR MAKING POLYARYLENE ETHERS FROM MESITOL

[75] Inventor: Dwain M. White, Schenectady, N.Y.

[73] Assignee: General Electric Company, Schenectady, N.Y.

[21] Appl. No.: 572,139

[22] Filed: Dec. 14, 1995

[51] Int. Cl.$^6$ ....................................................... C08G 65/44
[52] U.S. Cl. .......................... 528/212; 502/150; 528/86; 528/215; 528/216
[58] Field of Search ........................... 528/86, 212, 215, 528/216; 502/150

[56] References Cited

U.S. PATENT DOCUMENTS 3,749,693  7/1973  Cooper ..................................... 528/212

OTHER PUBLICATIONS

Journal of the American Chemical Society, 88:5, Mar. 5, 1966, pp. 1074–1076.

*Primary Examiner*—Terressa Mosley
*Attorney, Agent, or Firm*—William H. Pittman

[57] ABSTRACT

A method for making polyarylene ethers comprising the step of melt polymerizing 2,6-disubstituted-4-alkylphenols in the presence of an oxidative coupling catalyst and in the absence of environmentally unfriendly solvents.

17 Claims, No Drawings

METHOD FOR MAKING POLYARYLENE ETHERS FROM MESITOL

This application is related to copending application Ser. No. 08/522,165, entitled "Solventless Method for Making Polyarylene Ethers".

FIELD OF THE INVENTION

This invention relates to a novel method for making polyarylene ethers. More particularly, the instant invention is directed to a method for making polyphenylene ethers by melt polymerizing 2,6-disubstituted-4-alkylphenols in the presence of an oxidative coupling catalyst and in the absence of environmentally unfriendly solvents.

BACKGROUND OF THE INVENTION

Polyphenylene ethers (PPE) as well as blends prepared therefrom constitute an invaluable class of engineering thermoplastic resins. Resins of polyphenylene ethers are characterized by a unique combination of chemical, physical and electrical properties. For instance, they have favorable heat deflection temperatures and generally display high impact strengths. As a result of this unique combination of properties, resins of polyphenylene ethers are suitable for a broad range of commercial applications.

Typically, polyphenylene ethers are prepared via the oxidative coupling of phenols in the presence of a catalyst, and the oxidative coupling is carried out in an organic solvent such as toluene. Such phenols are conventionally 2,6-dimethylphenols and not 2,6-disubstituted-4-alkylphenols (common by-products of 2,6-dimethylphenol synthesis) which are typically disposed of since they characteristically decrease polymerization rates and act as polymer chain terminators.

Subsequent to polymerizing the phenols, solid polymer is isolated by precipitation with non-solvents like methanol. However, the typical oxidative coupling method is not very favorable, since among other reasons, it requires the use of large quantities of environmentally unfriendly solvents which must be recovered and purified by expensive and time consuming process steps.

It is of increasing interest to prepare polyarylene ethers by a method which does not, for instance, require the use of organic solvents. Moreover, it is of increasing interest to prepare such ethers by a method which employs 2,6-disubstituted-4-alkylphenols since they are available and their disposal may be difficult, time consuming and costly.

DESCRIPTION OF THE PRIOR ART

Efforts have been disclosed for preparing polyphenylene ethers. In U.S. Pat. No. 3,306,875, the disclosure of which is incorporated herein by reference, poly-(2,6-dimethyl-1,4-phenylene)-ether was prepared by reacting 2,6-dimethylphenol and CuCl in an organic solvent.

Still other investigators have made efforts for preparing polyphenylene ethers. In U.S. Pat. No. 4,028,341, the disclosure of which is incorporated herein by reference, polyphenylene ethers are prepared by reacting phenolic monomers, oxygen gas and copper catalysts in organic solvents.

Additional efforts have been disclosed for producing polyphenylene ethers. In U.S. Pat. No. 3,749,693, copper catalysts and organic solvents have been employed to convert hydroxyaromatic monomers to polyphenylene ether homopolymers.

Finally, in the *Journal of American Chemical Society*, page 1074, Mar. 5, 1966, efforts for the oxidative dealkylation of mesitol with a manganese dioxide reactant are described.

SUMMARY OF THE INVENTION

In a first aspect, the instant invention is directed to a method for making polyarylene ethers, said method comprises the step of melt polymerizing in the absence of solvents:

(a) monomers having the formulae

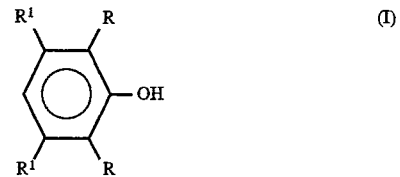

and

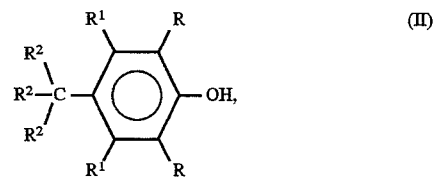

wherein:
(i) each R is independently a halogen, $C_{1-10}$ alkyl group, aryl group haloalkyl, aminoalkyl, hydrocarbonoxy, or halohydrocarbonoxy having at least 2 carbon atoms separating the halogen and oxygen atoms;
(ii) each $R^1$ is independently a hydrogen, halogen, $C_{1-10}$ alkyl group, aryl group, haloalkyl, hydrocarbonoxy, or halohydrocarbonoxy as previously defined; and
(iii) each $R^2$ is independently a hydrogen, halogen, $C_{1-10}$ alkyl group, $C_{1-10}$ alkoxy group or an aryl group, with the proviso that R, $R^1$ and $R^2$ do not prevent oxidative coupling;

(b) An oxidative coupling catalyst; and (c) oxygen.

In a second aspect, the instant invention is directed to solvent free solid or melt mixtures comprising the monomers represented by formulae I and II.

DETAILED DESCRIPTION OF THE PREFERRED EMBODIMENTS

In the instant invention, it is often preferred that the monomers represented by formula I are 2,6-dimethylphenol (2,6-xylenol) and/or 2,3,6-trimethylphenol (TMP). Additionally, it is often preferred that the monomers represented by formula II are 2,4,6-trimethylphenol(2,4,6-mesitol).

In the instant invention, it has been unexpectedly discovered that monomers represented by formulae I and II can be melt polymerized with favorable reaction rates under melt polymerization conditions. Particularly, it has been unexpectedly discovered that 2,6-disubstituted-4-alkylphenols, compounds typically avoided when making polyarylene ethers, may be employed to efficiently make such ethers, and efficiently is defined herein to mean that at least about 90 percent and preferably at least about 95 percent and most preferably at least about 98 percent of all bonds made in the polymerization are ether bonds. To this end, there is no limitation with respect to the mole ratio of monomers represented by formulae I and II which may be employed in this invention other than that monomers represented by each formula are present. Often, however, about 1 to about 99 and preferably about 3 to about 50 and most preferably about 5 to about 30 mole percent of monomers represented by formula II are present based on total moles of monomeric units present in the polyarylene ether produced.

The monomers represented by formula I are commercially available and can be prepared, for example, by reacting hydroxyaromatic compounds like phenol with alkanols like methanol in the presence of a catalyst. The monomers represented by formula II are, again, common by-products of 2,6-dimethylphenol production and can be prepared, for example, by a Friedel-Crafts alkylation of phenols.

There is no limitation with respect to the catalyst employed in the instant invention, in fact, any conventional oxidative coupling catalyst known in the art may be employed and they often include those having a metal portion and an amine portion. Illustrative examples of such catalysts include those containing a copper compound and described in U.S. Pat. Nos. 3,306,874, 3,306,875, 3,914,266 and 4,028,341, the disclosures of which are incorporated herein by reference. These catalyst containing copper compounds are usually combinations of cuprous or cupric ions, halide and at least one amine. Often preferred copper containing catalysts include CuBr/dibutylamine, CuBr/N,N'-di-tert-butyl-1,2-ethylenediamine and CuBr/N,N-dimethylbutylamine as well as mixtures prepared therefrom.

Additional catalyst systems that may be employed in this invention include those containing manganese compounds. They are generally alkaline systems in which divalent manganese is combined with such anions as halide, alkoxide or phenoxide. Most often, the manganese is present as a complex with one or more complexing and/or chelating agents such as dialkylamines, alkanolamines, alkenediamines, o-hydroxyaromatic aldehydes, o-hydroxyazo compounds and α-hydroxyoximes.

When preparing polyarylene ethers like polyphenylene ethers via melt polymerization of the monomers depicted in formulae I and II, catalyst stability/activity can decrease as temperatures are increased during the course of the reaction. The increase in temperature is often necessary to offset the increase in melt viscosity that occurs as molecular weight builds. Analysis of resulting off-gases from phenolic monomer polymerization reactions indicates the presence of amines. Often, replenishing of amine yields some renewed catalyst activity; however, it is less than expected and results in a large amount of amine usage.

To this end, high boiling point amine catalysts are often preferred either initially or when the molecular weight of the desired polymer builds and reaction temperatures are increased. Such high boiling point catalysts which may be employed in this invention include those having a metal portion in combination with tertiary amines like trialkylamines including tributylamine (TBA), tripentylamine (TPA), N,N-dimethylbutylamine (DMBA) and N,N-dimethyloctylamine (DMOA) as well as mixtures prepared therefrom, wherein mixtures are meant to include combinations of tertiary amines and tertiary amines with secondary amines, including mono- and diamines.

Additionally, high boiling point secondary amines may sometimes be preferred and they include higher molecular weight dialkylamines wherein the higher molecular weight dialkylamines are defined herein to mean those with each alkyl group independently being greater than about 4 carbon atoms. Illustrative examples include dibutylamine, dipentylamine and N,N-butylpentylamine.

The often preferred mixtures employed in this invention are those comprising at least one tertiary amine and at least one secondary amine. Illustrative examples include mixtures comprising TBA or DMOA, and DBEDA.

When high boiling point amine catalyst mixtures are employed, there is essentially no limitation to the proportion of secondary and tertiary amines employed. Often, however, greater than about 10% and preferably greater than about 25% and most preferably greater than about 40% of the total weight of catalyst (metal portion and amine portion) is secondary amine.

As previously stated, the novel method comprises the step of melt polymerizing monomers in the presence of a catalyst and oxygen. There is no limitation with respect to the order in which the reactants and catalyst are added and each may be added in one addition or in portions. Often, however, the amine portion of the catalyst and phenolic monomers are mixed and heated to produce a melt. The melt may be stirred to homogeneity and additional catalyst components may be added thereafter. The temperature at which the instant invention may be carried out is essentially only limited to what is required to: (1) keep the monomers (and subsequently the resulting reaction mixture of monomers, oligomers and polymers) molten; and (2) assure that the catalysts are not destroyed. The temperature of the melt is often from about 30° C. to about 150° C. and preferably from about 35° C. to about 120° C. and most preferably from about 35° C. to about 100° C., including all ranges subsumed therein.

There is essentially no limitation with respect to the pressure (oxygen pressure) at which the instant invention may be carried out, other than that the pressure is limited only to the extent that polymerization can occur and is often from about atmospheric pressure to about 5,000 psig, preferably atmospheric pressure.

The amount of oxidative coupling catalyst employed in this invention varies with respect to the metal portion and the amine portion. The metal portion is often about 0.02 mole percent to about 5.0 mole percent and preferably about 0.04 mole percent to about 1.0 mole percent and most preferably from about 0.05 mole percent to about 0.5 mole percent based on total moles of phenolic monomers employed.

The amine portion is often about 1.0 mole percent to about 10.0 mole percent and preferably about 2.0 mole percent to about 8.0 mole percent and most preferably from about 3.0 to 5.0 mole percent based on total moles of the phenolic monomers employed.

There is no limitation with respect to the apparatus which may be employed. In fact any apparatus with a gas inlet, heating and cooling capability and stirring capability may be employed. Often, cylindrical round bottom glass reactors and pressure reactors are used.

Oxygen is introduced into the melt, and a reaction mixture is produced which is preferably stirred to maximize polymerization. The viscosity of the reaction mixture gradually increases indicating polymer formation; however, the viscosity does not increase to the point of preventing stirring until the polymerization is completed. Subsequent to polymerization of almost all of the monomer, the reaction mixture is cooled to produce a reaction product and polymer is obtained therefrom. Further, it is within the scope of the instant invention to include phase transfer catalysts and dilute the reaction product with solvents in order to recover polymers according to their respective molecular weights. Moreover, the molecular weights of the product obtained may vary in accordance with the equipment employed since greater mixing capabilities result in the formation of higher molecular weight polymer.

There is no limitation with respect to how the stirring of the reagents employed in this invention can take place. For instance, a magnetic or paddle stirrer may be employed. In a preferred embodiment, however, vigorous stirring is desired. This is true since vigorous stirring can increase the interfacial area between any oxygen present and the melt. In doing so, it has been found that the rate of oxygen transport into the melt increased, yielding improved polymerization.

The vigorous stirring described above can be achieved by most stirring mechanisms, and is often achieved by, for example, a high shear stirrer, extruder or homogenizer. Vigorous stirring, as used herein, is defined to mean any form of mechanical mixing capable of generating gas bubbles having a diameter less than about 1.0 mm and preferably less than about 0.5 mm and most preferably less than about 0.1 mm.

In regard to secondary products such as 3,3',5,5'-tetramethyl-4,4-diphenoquinone (TMDQ) produced via the instant method, the production of such may be minimized by the techniques known to those skilled in art which include controlling, for instance, concentrations as well as reaction temperature. Surprisingly, however, it has been unexpectedly discovered that the employment of 2,6-disubstituted-4-alkyl phenols often results in less secondary product formation, even at temperatures which traditionally enhance their formation, wherein less secondary product formation is defined herein to mean less than about 5.0 and preferably less than about 2.5 and most preferably less than about 1.0 percent yield after the polymerization of the monomers ceases.

The polymers obtained via the instant novel method include both homopolymer and copolymer polyphenylene ethers since it is within the scope of this invention to employ any viable mixture of monomers as represented by the formulae above. Typical homopolymers obtained are those which contain, for example, 2,6-dimethyl-1,4-phenylene ether units. Typical copolymers obtained include, for example, random copolymers containing such units in combination with 2,3,6-trimethyl-1,4-phenylene ether units. Often, the polymers obtained are characterized by their 3,5-dimethyl-4-hydroxyphenyl head end groups and their 2,6-dimethylphenoxy tail end groups.

Moreover, it is noted herein that the polyphenylene ethers produced via the instant invention can be blended with, for instance, high impact polystyrenes, polyamides and/or polyesters. Such blending is disclosed, for example, in U.S. Pat. Nos. 4,866,130, 4,826,933 and 5,091,472, the disclosures of which are incorporated herein by reference.

It is further noted herein that the polyphenylene ethers obtained may be functionalized via any conventional methods known to those skilled in the art. Such methods include those which employ chlorotriazines and polymerizable olefinic compounds and they are described, for example, in U.S. Pat. Nos. 5,115,043 and 4,994,525, the disclosures of which are incorporated herein by reference.

Regarding the second aspect of this invention, there is no limitation with respect to the amount of monomers represented by formulae I and II in the solvent free solid or melt mixtures. The mixtures (solid or melt) can comprise from about 1 to about 99 and preferably from about 3 to about 50 and most preferably from about 5 to about 30 mole percent of monomers represented by formula II based on total moles of monomer present in the mixture. Further, the mixture may comprise any of the coupling catalysts described herein.

The mixtures may be prepared by any conventional method for mixing solids and melts known in the art, including, for example, those which employ a means for stirring, shaking and agitating.

The following examples further illustrate and facilitate the understanding of the above-described novel process. The products obtained may be confirmed by conventional techniques such as proton and carbon-13 nuclear magnetic resonance spectroscopy, infrared spectroscopy and GPC analysis.

EXAMPLE 1

An upright cylindrical glass reaction vessel equipped with a thermometer, fritted glass plate at the bottom for oxygen passage and a homogenizer head positioned 5 mm above the fritted glass plate was charged with 1000 parts of a molten mixture having 147 g (1.2 moles) of 2,6-xylenol and 40.9 g 2,4,6-mesitol (0.3 moles) and catalyst of 1 part cuprous bromide, 1 part DBEDA and 40 parts DBA, all parts based on parts of copper [0.896 ml (1.5 mmol Cu) of a copper solution prepared by dissolving 1.2 g cuprous oxide (95%) into 9.8 ml (48%) hydrobromic acid, 0.270 g (1.5 mmol) DBEDA and 7.75 g (60 mmol) DBA]. The resulting mixture was stirred vigorously with the homogenizer and oxygen was passed through 2.0 standard cubic feet per hour yielding a reaction mixture. The reaction mixture was initially maintained at a temperature of about 50° C. and ice water cooling and heated water baths were used to regulate temperature. Within about 2 minutes, the reaction temperature leveled off and a temperature of about 60° C. was maintained for about 30 minutes.. Subsequently, the temperature was increased to about 70° C. for about 30 minutes, about 80° C. for about another 30 minutes and finally 90° C. for about 60 minutes.

The reaction mixture was sampled periodically by removing 0.2 mL portions, diluting the samples with deuterochloroform (2–3 mL), quenching with several drops of a 30% aqueous solution of trisodium nitrilotriacetate, and analyzing via NMR and GPC. Analysis indicated polyphenylene ether (about 90% yield), less than about 0.7% C—C bonds based on biphenyl protons and no free TMDQ was measured.

EXAMPLE 2

Example 2 was prepared in a manner similar to the one described in example 1 except that only 2,4,6-mesitol was employed (on a 35 g scale), the catalyst ratio was 1 part CuBr, 1 part DBEDA and 20 parts DBA for every 450 parts of monomer, a paddle stirrer was employed in lieu of a homogenizer and the oxygen flow rate was 0.25 standard cubic feet per hour. After about 6 hours about 80% of all 2,4,6-mesitol remained unpolymerized indicating that the favorable reaction rates were unexpected when the monomers depicted by formulae I and II were co-polymerized.

What is claimed is:

1. A method for making polyarylene ethers, said method comprises the step of melt polymerizing, in the absence of solvents:

(a) a mixture of monomers having the formulae

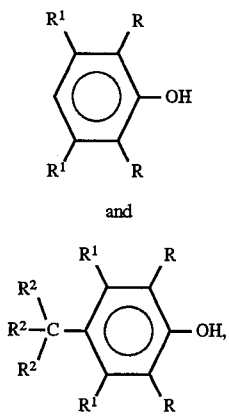

and wherein:
(i) each R is independently halogen, $C_{1-10}$ alkyl, aryl, haloalkyl, aminoalkyl, hydrocarbonoxy, or halohydrocarbonoxy having at least 2 carbon atoms separating the halogen and oxygen atoms;
(ii) each $R^1$ is independently hydrogen, halogen, $C_{1-10}$ alkyl, aryl, haloalkyl, hydrocarbonoxy, or halohydrocarbonoxy as previously defined; and
(iii) each $R^2$ is independently a hydrogen, halogen, $C_{1-10}$ alkyl, $C_{1-10}$ alkoxy or aryl,
with the proviso that R, $R^1$ and $R^2$ do not prevent oxidative coupling; in the presence of
(b) an oxidative coupling catalyst; and
(c) oxygen.

2. A method for making polyarylene ethers in accordance with claim 1 wherein said oxidative coupling catalyst comprises copper or manganese.

3. A method for making polyarylene ethers in accordance with claim 2 wherein said oxidative coupling catalyst comprises a metal portion and an amine portion and is CuBr/dibutylamine, CuBr/M,N-di-tert-butyl-1,2-ethylenediamine or a mixture prepared therefrom.

4. A method for making polyarylene ethers in accordance with claim 3 wherein said metal portion is about 0.02 mole percent to about 5.0 mole percent and said amine portion is from about 1.0 mole percent to about 10.0 mole percent based on total moles of monomers employed.

5. A method for making polyarylene ethers in accordance with claim 1 wherein the melt polymerizing of monomers occurs at a temperature from about 30° C. to about 150° C.

6. A method for making polyarylene ethers in accordance with claim 1 wherein said polyarylene ethers are polyphenylene ether homopolymers comprising 2,6-dimethyl-1-4-phenylene ether units.

7. A method for making polyarylene ethers in accordance with claim 1 wherein said polyarylene ethers are polyphenylene ether copolymers comprising 2,6-dimethyl-1,4-phenylene ether units and 2,3,6-trimethyl-1,4-phenylene ether units.

8. A method for making polyarylene ethers in accordance with claim 1 wherein the melt polymerization of monomers occurs at a pressure from about atmospheric pressure to about 5,000 psig.

9. A method for making polyarylene ethers in accordance with claim 1 wherein the .melt polymerization of monomers occurs while stirring said monomers, oxidative coupling catalyst and oxygen.

10. A method for making polyarylene ethers in accordance with claim 9 wherein said stirring is accomplished with a magnetic or paddle stirrer.

11. A method for making polyarylene ethers in accordance with claim 9 wherein said stirring is accomplished with a high shear stirrer, extruder or homogenizer.

12. A method for making polyarylene ethers in accordance with claim 1 wherein said oxidative coupling catalyst has a metal portion in combination with a tertiary amine or a metal portion in combination with a mixture having a tertiary amine and secondary amine.

13. A method for making polyarylene ethers in accordance with claim 12 wherein said metal portion is a copper portion said tertiary amine is TBA, TPA, TMBA or DMDA and said secondary amine is DBEDA or DBA.

14. A method for making polyarylene ethers in accordance with claim 1 wherein the monomers represented by formula I are selected from the group consisting of 2,6-dimethylphenol and 2,3,6-trimethylphenol and the monomers represented by formula II are 2,4,6-trimethylphenol.

15. A method for making polyarylene ethers in accordance with claim 1 wherein less than about 5.0 percent yield of 3,3',5,5'-tetramethyl-4,4-diphenoquinone is present after the monomers are melt polymerized.

16. A solvent free solid mixture or melt mixture comprising monomers having the formulae

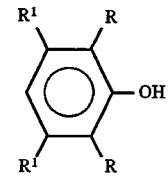 (I)

and

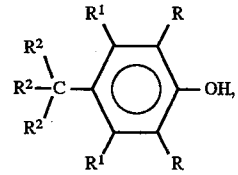 (II)

wherein:
(i) each R is independently a halogen, $C_{1-10}$ alkyl group, aryl group haloalkyl, aminoalkyl, hydrocarbonoxy, or halohydrocarbonoxy having at least 2 carbon atoms separating the halogen and oxygen atoms;
(ii) each $R^1$ is independently a hydrogen, halogen, $C_{1-10}$ alkyl group, aryl group, haloalkyl, hydrocarbonoxy, or halohydrocarbonoxy as previously defined; and
(iii) each $R^2$ is independently a hydrogen, halogen, $C_{1-10}$ alkyl group, $C_{1-10}$ alkoxy group or an aryl group; and an oxidative coupling catalyst.

17. A mixture in accordance with claim 16 wherein said oxidative coupling catalyst comprises a metal potion and an amine potion and is CuBr/dibutylamine, CuBr/M,N-di-tert-butyl-1,2-ethylenediamine or a mixture prepared therefrom.

* * * * *